(12) United States Patent
Wetzel (10) Patent No.: US 11,021,052 B2
(45) Date of Patent: Jun. 1, 2021

(54) CAPLESS CLOSURE ASSEMBLY FOR FUEL-TANK FILLER PIPE

(71) Applicant: Stant USA Corp., Connersville, IN (US)

(72) Inventor: Paul C. Wetzel, Oxford, OH (US)

(73) Assignee: Stant USA Corp., Connersville, IN (US)

( * ) Notice: Subject to any disclaimer, the term of this patent is extended or adjusted under 35 U.S.C. 154(b) by 0 days.

(21) Appl. No.: 16/701,911

(22) Filed: Dec. 3, 2019

(65) Prior Publication Data

US 2020/0361311 A1    Nov. 19, 2020

Related U.S. Application Data

(63) Continuation-in-part of application No. 16/514,037, filed on Jul. 17, 2019.

(60) Provisional application No. 62/847,499, filed on May 14, 2019, provisional application No. 62/878,016, filed on Jul. 24, 2019.

(51) Int. Cl.
*B60K 15/04* (2006.01)
*F16K 31/528* (2006.01)
*B60K 15/03* (2006.01)

(52) U.S. Cl.
CPC .......... *B60K 15/04* (2013.01); *F16K 31/5282* (2013.01); *B60K 2015/03019* (2013.01); *B60K 2015/03026* (2013.01); *B60K 2015/0477* (2013.01)

(58) Field of Classification Search
CPC .......... B60K 15/04; B60K 2015/03026; B60K 2015/03019; B60K 2015/0477; F16K 31/5282
See application file for complete search history.

(56) References Cited

U.S. PATENT DOCUMENTS

| | | |
|---|---|---|
| 6,189,581 B1 | 2/2001 | Harris et al. |
| 6,431,228 B2 | 8/2002 | Foltz et al. |
| 6,691,750 B1 | 2/2004 | Foltz |
| 6,732,840 B2 | 5/2004 | Ikeda et al. |
| 6,755,057 B2 | 6/2004 | Foltz |
| 7,882,862 B2 | 2/2011 | DeCapua et al. |
| 10,000,117 B2 | 6/2018 | Giles et al. |
| 10,065,496 B2 | 9/2018 | Frank et al. |
| 10,226,996 B2 | 3/2019 | Giles et al. |
| 2013/0213963 A1* | 8/2013 | Chretien ............. B67D 7/06 220/86.2 |
| 2014/0096835 A1 | 4/2014 | Yager et al. |
| 2014/0346171 A1 | 11/2014 | Yamamoto et al. |
| 2015/0001215 A1 | 1/2015 | Kito et al. |
| 2015/0048087 A1 | 2/2015 | Hagano et al. |
| 2016/0009173 A1 | 1/2016 | Sperando et al. |
| 2016/0048087 A1 | 2/2016 | Yang et al. |
| 2016/0311316 A1 | 10/2016 | Kerstein |
| 2017/0072790 A1 | 3/2017 | Frank et al. |

(Continued)

FOREIGN PATENT DOCUMENTS

JP     2018095153 A    6/2018
KR    2019990003290 U    1/1999

*Primary Examiner* — Jason K Niesz
(74) *Attorney, Agent, or Firm* — Barnes & Thornburg LLP (57) ABSTRACT

A capless filler pipe closure is provided for a tank filler pipe. The capless closure permits a fuel pump nozzle to be inserted into the tank filler pipe without first removing a fuel cap form the outer end of the tank filler pipe.

20 Claims, 8 Drawing Sheets

(56) References Cited

U.S. PATENT DOCUMENTS

2017/0158048 A1 6/2017 Giles et al.
2019/0023125 A1 1/2019 Costa et al.

* cited by examiner

CAPLESS CLOSURE ASSEMBLY FOR FUEL-TANK FILLER PIPE

PRIORITY CLAIM

This application is a continuation-in-part of U.S. application Ser. No. 16/514,037 filed Jul. 17, 2019, which claims priority under 35 U.S.C. § 119(e) to U.S. Provisional Application No. 62/847,499, filed May 14, 2019 and further claims priority under 35 U.S.C. § 119(e) to U.S. Provisional Application No. 62/878,016, filed Jul. 24, 2019, each of which is expressly incorporated by reference herein.

BACKGROUND

The present disclosure relates to a filler pipe closure for a tank filler pipe. More particularly, the present disclosure relates to a capless closure that permits a fuel-dispensing pump nozzle to he inserted into a tank filler pipe to supply fuel to a fuel tank and closes the tank filler pipe when the fuel-dispensing pump nozzle is removed from the closure.

Many vehicles include a fuel tank, a fuel-tank filler pipe coupled to the fuel tank to communicate liquid fuel from a fuel-dispensing pump nozzle to the fuel tank, and a closure coupled to the fuel-tank filler pipe to seal the fuel-tank filler pipe. During refueling, the fuel-dispensing pump nozzle is passed by a user first through an outer chamber associated with an outer end of the fuel-tank filler pipe that is open to the atmosphere and then through a nozzle-receiving aperture into a fuel-conducting passageway formed in the fuel-tank filler pipe. Then the pump nozzle is actuated by the user to cause liquid fuel discharged by the pump nozzle to flow through the fuel-conducting passageway into the fuel tank.

SUMMARY

According to the present disclosure, a fuel-tank filler apparatus comprises a filler pipe closure that is adapted to be coupled to a fuel-tank fuel filler pipe. In illustrative embodiments, the filler pipe closure is a capless system that includes a nozzle-insertion housing that is configured to mate with an outer end of a fuel filler pipe to provide a fill tube that leads to a vehicle fuel tank. The filler pipe closure also includes an O-ring seal that surrounds the nozzle-insertion housing and engages an inner surface of the fuel filler pipe to establish a liquid fuel and fuel vapor seal between the fuel filler pipe and the nozzle-insertion housing. A fuel-dispensing pump nozzle is sized to extend through the nozzle-insertion housing of the capless filler pipe closure during refueling of the vehicle fuel-tank.

In illustrative embodiments, the nozzle-insertion housing includes an overflow-capture-and-drainage fuel management system that captures liquid fuel that has backed up the fuel filler neck at the end of a tank refueling activity after the fuel tank has been filled. The fuel management system then drains that captured fuel back to the fuel tank after the fuel-dispensing pump nozzle has been removed from the nozzle-insertion housing.

In illustrative embodiments, the nozzle-insertion housing is formed to include an outer chamber, an outer nozzle-receiving aperture that is open to the atmosphere and to the outer chamber, and an inner nozzle-receiving aperture that is located to interconnect the outer chamber in fluid communication with an inner chamber that communicates with a fuel-conducting passageway formed in the fuel filler pipe when the nozzle-insertion housing is mated with the outer end of the fuel filler pipe. The overflow fuel management system includes a shell that is formed to define at least a portion of the inner chamber of the nozzle-insertion housing and a nozzle receiver that is surrounded by the shell and aligned with and located below the inner nozzle-receiving aperture. The pump nozzle extends through the outer and inner chambers and nozzle-receiving apertures and also extends through the nozzle receiver in the overflow fuel management system during tank refueling activities.

In illustrative embodiments, the filler pipe closure further includes spring-biased nozzle-actuated outer and inner flapper doors. The outer flapper door is mounted on the nozzle-insertion housing for movement relative to the nozzle-insertion housing between a closed position closing the outer nozzle-receiving aperture formed in the nozzle-insertion housing and an opened position opening that outer nozzle-receiving aperture. The inner flapper door is mounted on the nozzle-insertion housing for movement relative to the nozzle-insertion housing between a closed position closing the inner nozzle-receiving aperture formed in the nozzle-insertion housing and an opened position opening that inner nozzle-receiving aperture. The inner flapper door is arranged to lie below the outer flapper door and above the shell and the nozzle receiver of the overflow fuel management system.

In illustrative embodiments the tip of a fuel-dispensing pump nozzle is moved by a user during refueling of the fuel tank first to engage the normally closed outer flapper door and then to move the outer flapper door against a closing force applied by a companion outer spring to assume the opened position. The nozzle tip is then passed through the outer chamber to engage the normally closed inner flapper door and then move the inner flapper door against a closing force applied by a companion inner spring to assume the opened position. The nozzle tip is then moved past the opened inner flapper door into the inner chamber that communicates with the fuel-conducting passageway formed in the fuel filler pipe so that the nozzle tip passes downwardly through the nozzle receiver that is included in the fuel management system and aligned with the inner nozzle-receiving aperture. The pump nozzle may then be actuated by the user to dispense fuel into the fuel-conducting passageway that leads to the fuel tank.

In illustrative embodiments, the fuel-overflow-capture-and-drainage fuel management system located in the inner chamber of the nozzle-insertion housing functions to capture overflow liquid fuel dispensed by a pump nozzle during a tank-refueling activity in overflow reservoirs provided in the inner chamber of the nozzle-insertion housing. And then drain that captured overflow liquid fuel back into the fuel filler pipe that leads to the vehicle fuel tank after the pump nozzle has been removed from the nozzle-insertion housing.

In illustrative embodiments, the overflow fuel management system in accordance with the present disclosure comprises one or more overflow reservoirs that are located in the inner chamber alongside the tip of the pump nozzle during insertion of the pump nozzle into the nozzle-insertion housing during an tank-refueling activity. The overflow reservoirs are provided in the fuel management system between the nozzle receiver and a portion of the shell and are arranged to capture liquid fuel that is extant in the inner chamber because it has backed up in the fuel filler pipe from the fuel tank near the end of the tank-refueling activity after the tank has been filled. Each overflow reservoir is bounded in part by a floor that is located rear the distal end of the nozzle-insertion housing and is formed to include a reservoir drain hole to meter discharge of overflow reservoir fuel captured in the overflow reservoir under gravity into the fuel-conducting passageway of the fuel filler pipe. The reservoir drain hole has an inlet arranged to open upwardly into the overflow reservoir and an outlet formed in an exterior surface of the nozzle-insertion housing to open downwardly into the fuel-conducting passageway of the fuel filler pipe.

In illustrative embodiments, the overflow fuel management system comprises a semi-circular fuel-collection unit that is formed to define the nozzle receiver and to include ten relatively deep overflow reservoirs that are arranged to lie in series in side-by-side relation to one another on a semi-circular arc around the nozzle receiver and a central axis of the fuel filler pipe. The semi-circular fuel-collection unit is mounted to an inner surface of the shell in the inner chamber of the nozzle-insertion housing and is oriented to cause a reservoir inlet opening into each overflow reservoir to face outwardly toward the outer chamber of the nozzle-insertion housing. The reservoir drain hole associated with each overflow reservoir lies below its companion reservoir inlet near a lower edge of the semi-circular fuel-collection unit.

In illustrative embodiments, the fuel-collection unit is arranged to lie underneath the inner flapper door when the inner flapper door occupies the closed position. The fuel-collection unit is also arranged to lie in laterally spaced-apart relation to the inner flapper door when the inner flapper door occupies the opened position. The nozzle tip of the fuel-dispensing pump nozzle is arranged to lie between the opened inner flapper door and the semi-circular fuel-collection unit in the nozzle receiver when the pump nozzle is inserted into the outer and inner chambers during tank refueling so as to be surrounded in part by the semi-circular fuel-collection unit and the ten relatively deep overflow reservoirs formed in the fuel-collection unit.

In illustrative embodiments, the fuel-collection unit comprises a curved inner wall surrounded by a curved outer wall and a curved frusto-conical floor arranged to interconnect the curved inner and outer walls to form a semi-circular deep fuel-collection basin between the curved inner and outer walls. The curved inner wall forms a part of the nozzle receiver. The curved outer wall forms a part of the shell. The fuel-collection unit further includes a series of tall divider walls that lie in the fuel-collection basin and are arranged to partition the deep basin into a series of side-by-side top-opening deep overflow reservoirs. The curved frusto-conical floor is formed to include a reservoir drain hole for each overflow reservoir.

Additional features of the present disclosure will become apparent to those skilled in the art upon consideration of the following detailed description of illustrative embodiments exemplifying the best mode of carrying out the present disclosure as presently perceived.

BRIEF DESCRIPTION OF THE DRAWINGS

The detailed description particularly refers to the accompanying figures in which:

FIG. 3 is a sectional view taken along line 3-3 of FIG. 2 of a fuel-tank fill tube in accordance with the present disclosure showing an illustrative nozzle-insertion housing mounted in the outer end of a fuel filler pipe that is coupled to a fuel tank, and showing that the capless filler pipe closure further includes a spring-loaded nozzle-actuated outer flapper door located in an outer end of the nozzle-insertion housing and yieldably biased to assume a closed position closing an outer nozzle-receiving aperture formed in an outer section of the nozzle-insertion housing, a spring-loaded inner flapper door yieldably biased to assume a closed position closing an inner nozzle-receiving aperture formed in an inner section of the nozzle-insertion housing and arranged to lie in spaced-apart relation to the outer flapper door to define an outer chamber of the nozzle-insertion housing therebetween, and an overflow-capture-and-drainage system also included in the nozzle-insertion housing and configured in accordance with the present disclosure to conduct any overflow liquid fuel extant in an inner chamber formed in the nozzle-insertion housing into one or more overflow reservoirs for gravity discharge through one or more reservoir drain holes formed in a lower portion of the nozzle-insertion housing into a fuel-conducting passageway formed in the fuel filler pipe for delivery to the fuel tank near the end of a tank-refueling activity as suggested in FIG. 10;

FIG. 9 is an enlarged sectional view similar to FIG. 8 showing insertion of a fuel-dispensing pump nozzle into the capless system to open the spring-biased inner flapper door and suggesting that any backed-up overflow liquid fuel extant in the inner chamber that has surged upwardly past an aspirator opening in the fuel-dispensing pump nozzle toward the inner nozzle-receiving aperture near the end of a tank refueling activity after the fuel tank has been filled with fuel will fall under gravity into deep overflow reservoirs formed in the overflow-capture-and-drainage system located inside the fuel filler pipe and then exit those overflow reservoirs through reservoir-drain holes provided in the floors of the overflow reservoirs to flow downwardly into the fuel-conducting passageway that is formed in the fuel filler pipe and leads to the fuel tank.

DETAILED DESCRIPTION

Figure 1:
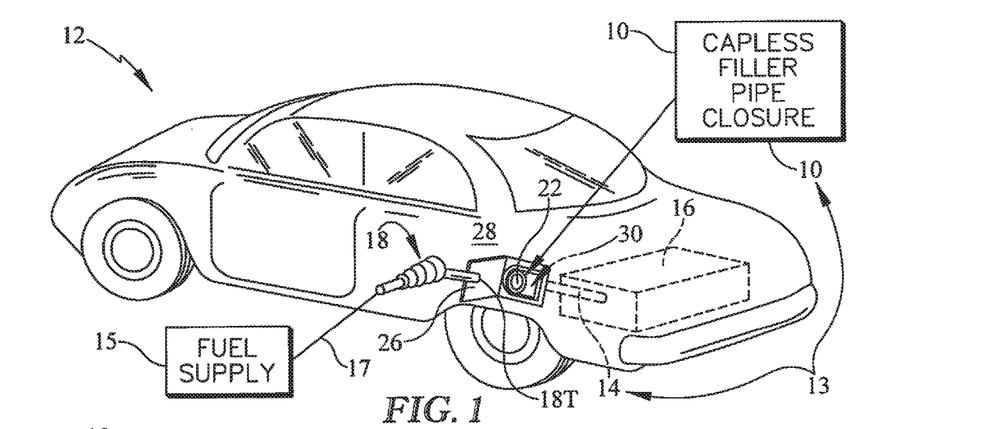
FIG. 1 is a perspective view showing an outer filler-pipe access door moved to an opened position relative to a vehicle body panel to expose an illustrative capless filler pipe closure that is coupled to a fuel filler pipe leading to a vehicle fuel tank and showing a fuel-dispensing pump nozzle that is coupled to a fuel supply and configured to be inserted into the capless filler pipe closure during tank refueling to discharge liquid fuel into the fuel filler pipe leading to the vehicle fuel tank.

A capless filler pipe closure 10 is provided in a vehicle 12 to close a fuel filler pipe 14 extending from a fuel tank 16 onboard vehicle 12 and to accept a fuel-dispensing pump nozzle 18 during fuel tank refueling as suggested in FIG. 1. Filler pipe closure 10 cooperates with fuel filler pipe 14 to define a fill tube 13 for conducting liquid fuel 11 from nozzle 18 to fuel tank 16. Pump nozzle 18 is coupled to a fuel supply 15 by a hose 17.

Figures 2, 3:
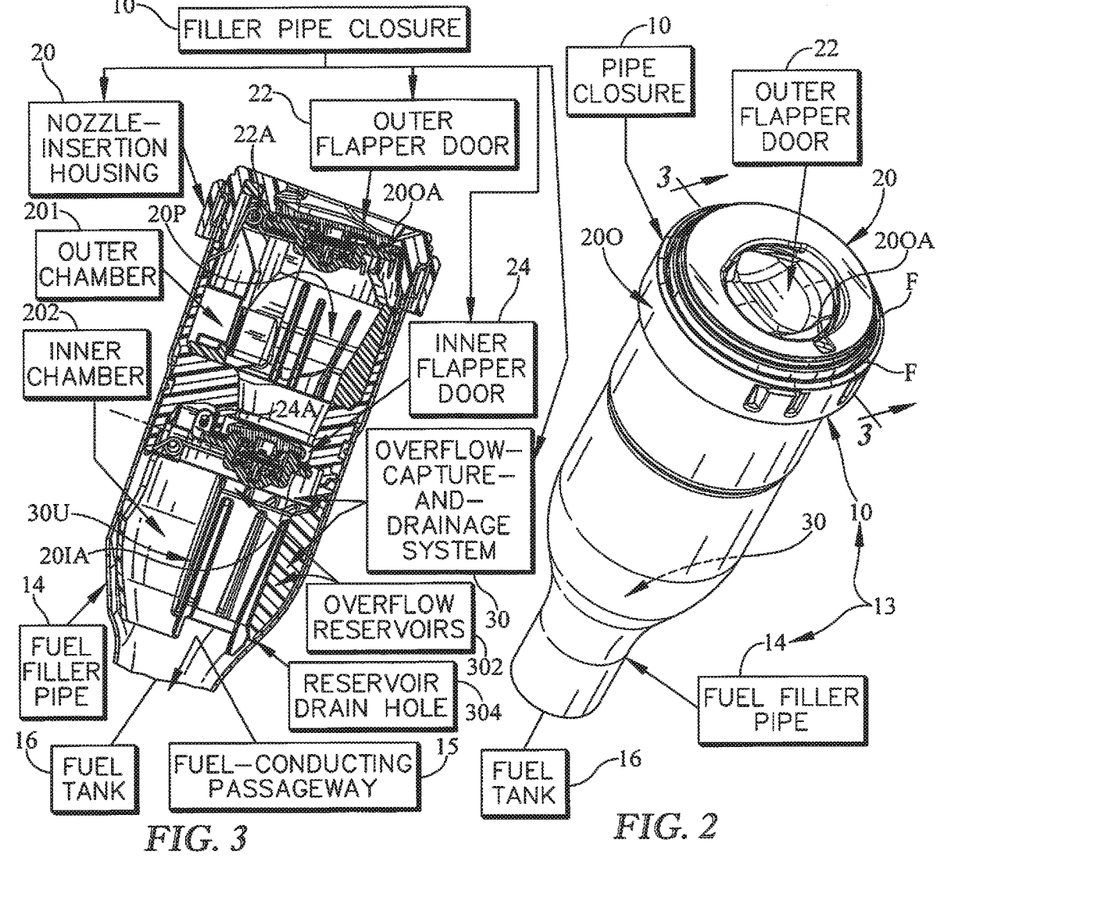
FIG. 2 is an enlarged perspective view of the capless filler pipe closure of FIG. 1 coupled to the fuel filler pipe to provide a fill tube for a fuel tank and showing an exposed portion of a nozzle-insertion housing that is coupled to an outer end of the fuel filler pipe and formed to include an outer nozzle-receiving aperture and also showing a pivotable outer flapper door closing the outer nozzle-receiving aperture.
Figure 9:
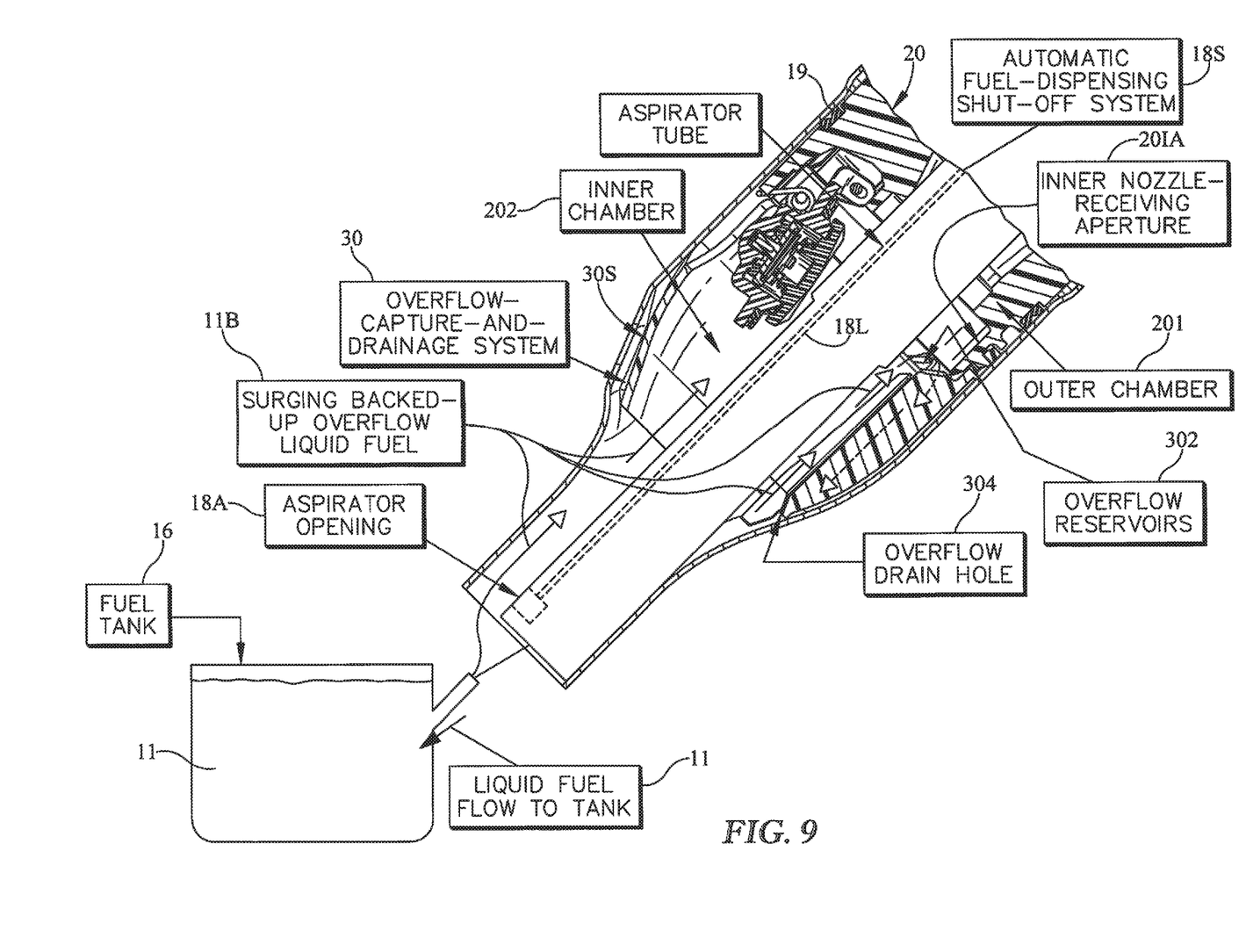

Filler pipe closure 10 includes an overflow-capture-and-drainage system 30 as shown in FIGS. 1 and 3 that functions to capture surging backed-up overflow liquid fuel 11B that flows upwardly in fuel filler pipe 14 at the end of a tank-refueling activity as suggested in FIG. 9. Overflow fuel management system 30 then functions to drain the liquid fuel 11O that has been captured in overflow reservoirs 302 to produce overflow drainage 11D that flows through fuel filler pipe 14 to fuel tank 16 after pump nozzle 18 has been removed from filler pipe closure 10 as suggested in FIG. 10. In an illustrative embodiment, overflow fuel management system 30 is mounted in a throat 14T included in fuel filler pipe 14 as suggested in FIGS. 3A, 4, and 6.

Capless filler pipe closure 10 is configured to close off fuel filler pipe 14 from the atmosphere until fuel-dispensing pump nozzle 18 is inserted into closure 10. Filler pipe closure 10 includes a nozzle-insertion housing 20 that is formed to include overflow-capture-and-drainage system 30 and is coupled to an outer end of fuel filler pipe 14 as suggested in FIGS. 2 and 3. Filler pipe closure 10 also includes an O-ring housing seal 19 that is mounted on an exterior surface of nozzle-insertion housing 20 to establish a liquid fuel and fuel vapor seal between fuel filler pipe 14 and nozzle-insertion housing 20 as suggested in FIG. 3A when filler pipe closure 10 is mounted in fuel filler pipe 14.

Figure 3A:
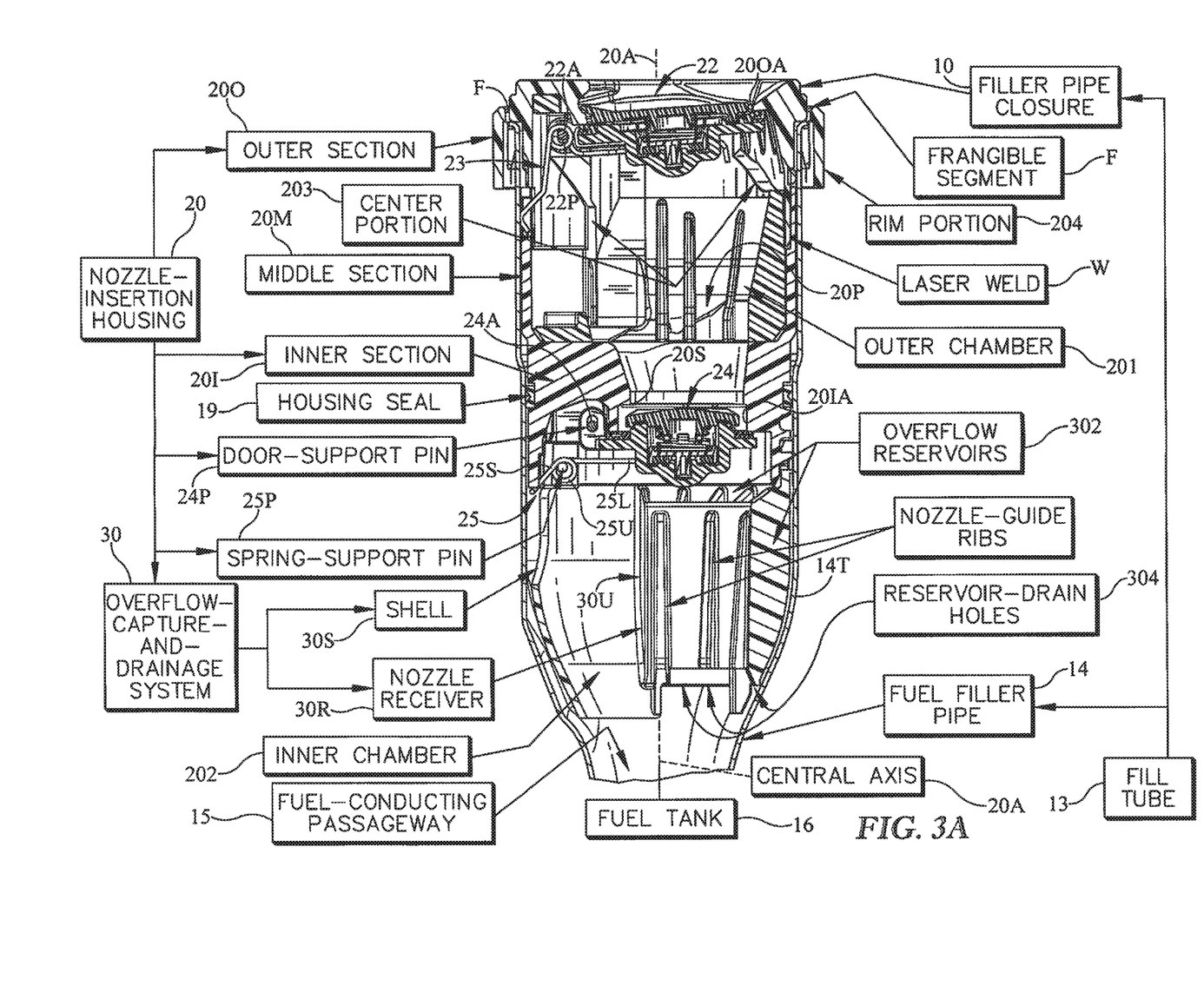
FIG. 3A is an enlarged view of FIG. 3 showing that the liquid-fuel overflow-capture-and-drainage system comprises several top-opening deep overflow reservoirs that are arranged to lie in the inner chamber formed in the nozzle-insertion housing to capture any backed-up liquid fuel that is able to flow upwardly from the fuel filler pipe into the inner chamber and into the overflow reservoirs near the end of a tank-refueling activity and then discharge captured overflow fuel under gravity through reservoir drain holes that communicate with the fuel filler pipe as suggested in FIG. 10 and also showing that the overflow-capture-and-drainage system comprises a shell, a nozzle receiver, and several deep overflow reservoirs located between the shell and the nozzle receiver as also shown in FIGS. 4-7.
Figure 3B:
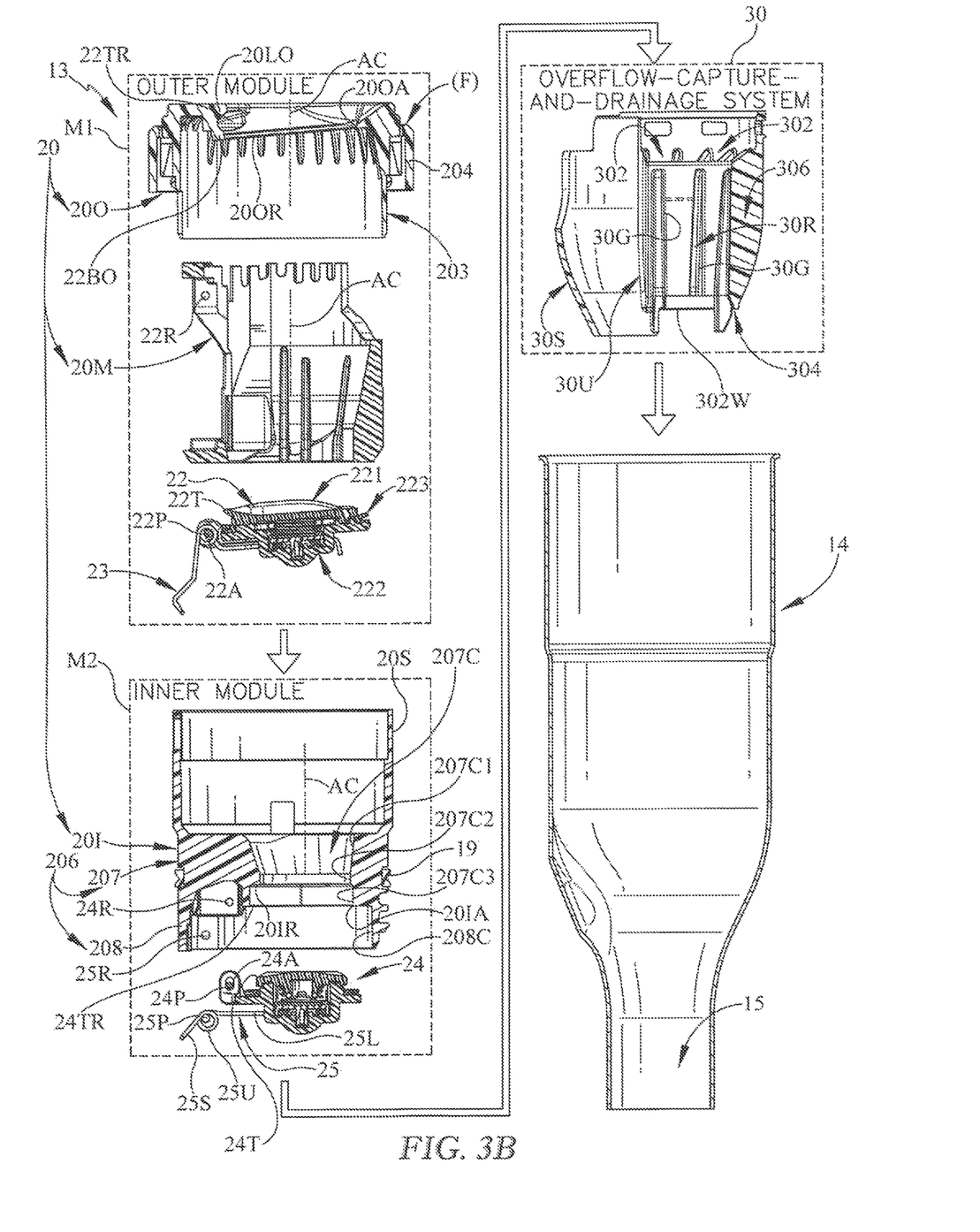
FIG. 3B is an exploded assembly view of the components shown in FIG. 3A suggesting that outer and middle sections of the nozzle-insertion housing cooperate with a spring-loaded outer flapper door to form an outer module of the filler pipe closure, that an inner section of the nozzle-insertion housing cooperates with a spring-loaded inner flapper door to form an inner module of the filler pipe closure, and that an overflow-capture-and-drainage system of the nozzle-insertion housing is arranged to lie under the inner and outer modules when the components are assembled as shown in FIG. 3A.
Figure 8:
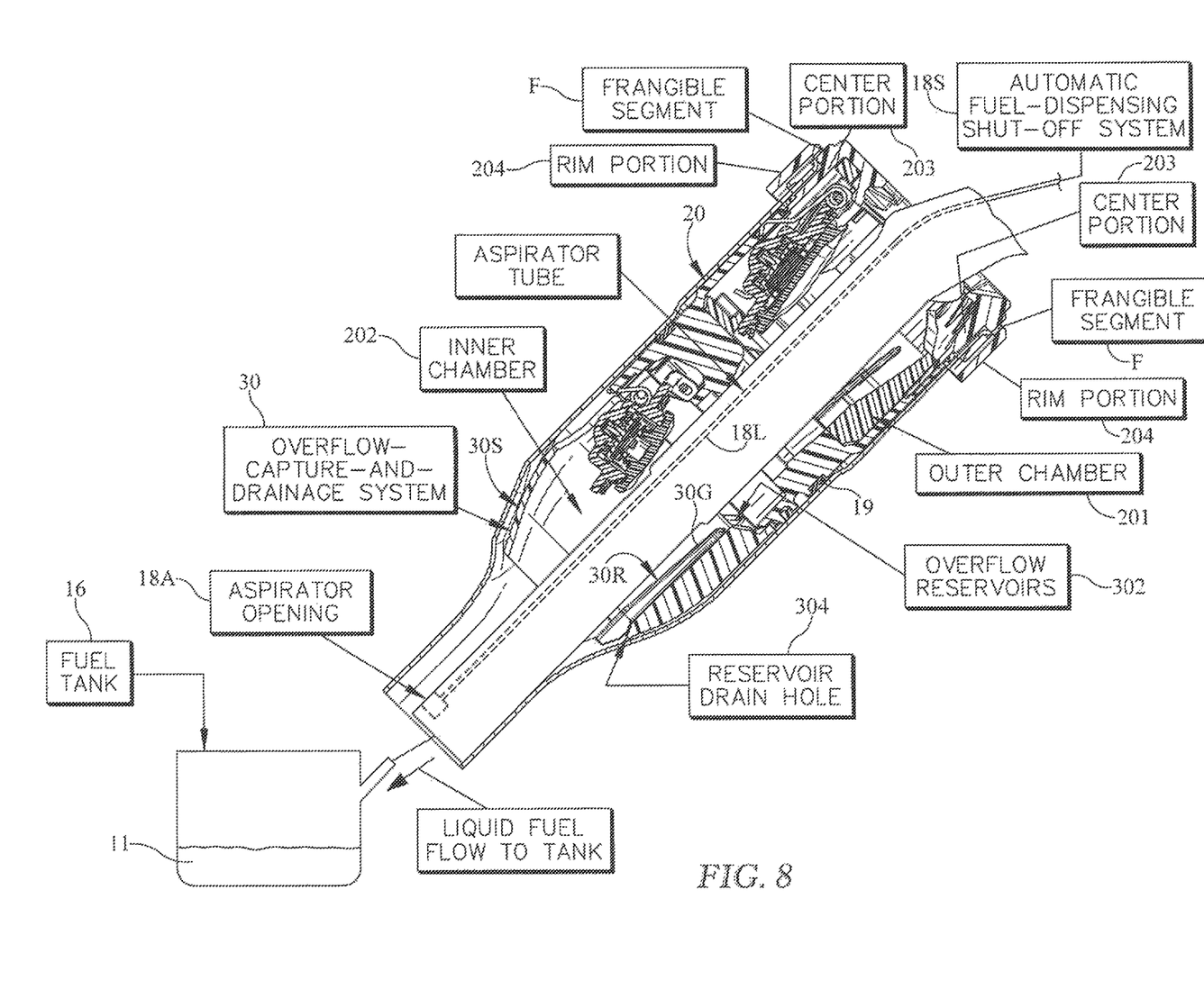
FIG. 8 is a sectional view of the capless system of FIGS. 1-3 taken along line 3-3 of FIG. 3 but showing that a fuel-dispensing pump nozzle has been inserted into the filler pipe closure to open each of the outer and inner flapper doors to extend through the nozzle receiver formed in the overflow-capture-and-drainage system but before the pump nozzle is actuated by a pump operator to discharge liquid fuel into a fuel-conducting passageway formed in the fuel filler pipe to begin to fill a rather empty fuel tank with liquid fuel.

Nozzle-insertion housing 20 is formed to include a passageway 20P that extends in an outer chamber 201 of nozzle-insertion housing 20 from an outer nozzle-receiving aperture 200A to an inner nozzle-receiving aperture 201A as suggested in FIGS. 3, 3A, and 3B. During fuel tank refueling, a user inserts the fuel-dispensing pump nozzle 18 into passageway 20P in nozzle-insertion housing 20 until a distal tip 18T of nozzle 18 extends into an inner chamber 202 of nozzle-insertion housing 20 and through a nozzle receiver 30R included in overflow fuel management system 30 and communicates with a fuel-conducting passageway 15 formed in fuel filler pipe 14 to transfer liquid fuel 11 discharged by nozzle 18 to fuel tank 16 through fuel filler pipe 14 as suggested in FIG. 8.

Filler pipe closure 10 also includes outer and inner flapper doors 22, 24 located inside nozzle-insertion housing 20 along nozzle-receiving passageway 20P as suggested in FIG. 3. A spring-loaded outer flapper door 22 is mounted on a middle section 20M of nozzle-insertion housing 20 as suggested in FIG. 3A for pivotable movement about an outer door-pivot axis 22A when engaged by tip 18T of moving fuel-dispensing pump nozzle 18. A spring-loaded inner flapper door 24 is mounted on an inner section 20I of nozzle-insertion housing 20 as suggested in FIG. 3A for pivotable movement about an inner door-pivot axis 24A when engaged by the moving nozzle tip 18T.

An overflow-capture-and-drainage system 30 of nozzle-insertion housing 20 is arranged to lie under the inner and outer modules M2, M1 when the components are assembled as shown in FIG. 3A. The liquid-fuel overflow-capture-and-drainage system 30 is arranged and configured to manage collection and drainage of any backed-up overflow liquid fuel 11B that is able to flow outwardly in fuel-conducting passageway 15 at the end of a tank-refueling activity toward an opened inner flapper door 24 as suggested in FIG. 9 to a region in the inner chamber 202 located above an aspirator opening 18A formed in the fuel-dispensing pump nozzle 18 and coupled via a shut-off line 18L to an automatic fuel-dispensing shut-off system 18S associated with pump nozzle 18 as suggested in FIG. 8.

Figure 10:
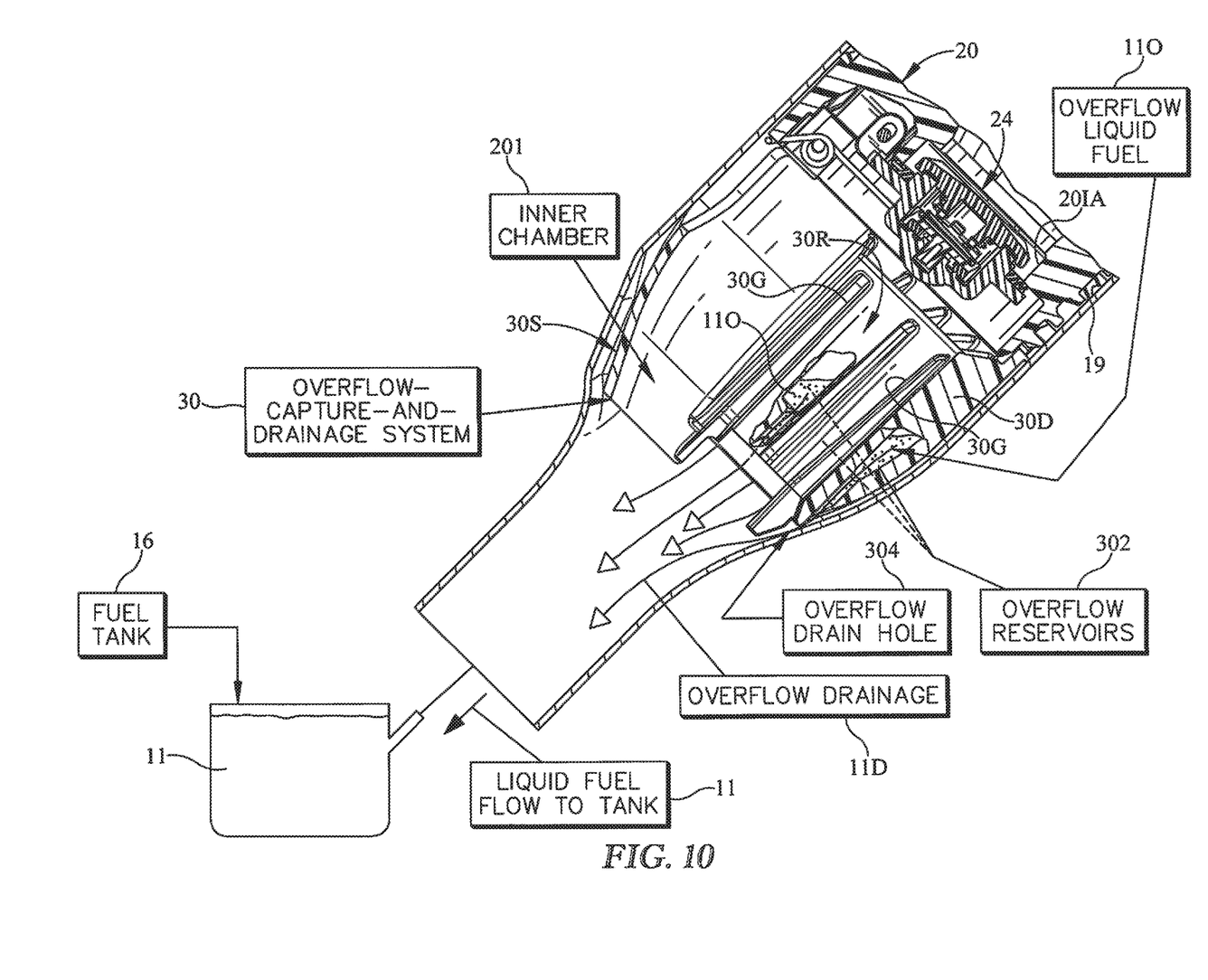
FIG. 10 is an enlarged portion of the fill tube shown in FIG. 9 after the fuel-dispensing pump nozzle has been removed from the fill tube at the end of a tank refueling activity with portions of the curved inner wall of the nozzle receiver broken away to reveal captured overflow liquid fuel stored in the overflow reservoirs and showing that the spring-loaded inner flapper door has returned to the closed position and that overflow liquid fuel captured in the overflow reservoirs is draining through reservoir-drain holes formed in a floor associated with the overflow reservoirs into the fuel-conducting passageway formed in the fuel filler pipe for delivery to the fuel tank.

During insertion of a fuel-dispensing pump nozzle 18 into the capless system 10 to open the spring-biased outer and inner flapper doors 22, 24, any backed-up overflow liquid fuel 11B extant in inner chamber 202 above aspirator opening 18A in the fuel-dispensing pump nozzle 18 that is discharged outwardly past the opened spring-biased inner flapper door 24 will fall under gravity into overflow reservoirs 302 formed in the overflow-capture-and-drainage system 30 located inside the fuel-tank filler pipe 14 and then exit those overflow reservoirs 302 as suggested in FIG. 10 through reservoir-drain holes 304 to flow downwardly into the fuel-conducting passageway 15 that leads to the fuel tank 16. The overflow-capture-and-drainage system 30 is formed to include ten top-opening overflow reservoirs 302 that will surround a pump nozzle 18 inserted into nozzle receiver 30R in an illustrative embodiment as suggested, for example, in FIGS. 6 and 7. Each overflow reservoir 302 is bounded, in part, by a bottom wall 302W formed to include a reservoir-drain hole 304 that opens into the fuel-conducting passageway 15 of fuel filler pipe 14 as suggested in FIGS. 6-8.

Nozzle-insertion housing 20 illustratively includes an outer section 20O, a middle section 20M, an inner section 20I, as shown, for example, in FIGS. 3A and 3B. An outer section 20O of nozzle-insertion housing 20 is mated with outer flapper door 22 and is visible to an observer as seen in FIG. 2. Outer section 20O is arranged to lie in axially spaced-apart relation to inner section 20I to locate middle section 20M between inner and outer sections 20I, 20O as suggested in FIGS. 3, 3A, and 3B. Inner section 20I is mated with inner flapper door 24 as suggested in FIGS. 3A and 3B.

Overflow-capture-and-drainage system 30 is coupled to an inner end of inner section 20I as suggested in FIGS. 3 and 3A. System 30 is arranged to extend downwardly away from the sections 20O, 20M, and 20I of nozzle-insertion housing 20 to empty overflow drainage 11D that has been captured and drained by overflow fuel management system 30 into fuel-conducting passageway 15 of fuel filler pipe 14 as suggested in FIG. 3A.

Overflow-capture-and-drainage system 30 is located in inner chamber 202 of nozzle-insertion housing 20 to capture backed-up overflow liquid fuel 11B dispensed by a pump nozzle 18 during a tank-refueling activity in overflow reservoirs 302 provided in inner chamber 202 of nozzle-insertion housing 20. That captured overflow liquid fuel 11O is then drained back as overflow drainage 11D into the fuel filler pipe 14 that leads to vehicle fuel tank 16. This overflow fuel management system 30 comprises one or more overflow reservoirs 302 that are located in the inner chamber 202 alongside tip 18T of pump nozzle 18 during insertion of pump nozzle 18 into nozzle-insertion housing 20 during an tank-refueling activity. Overflow reservoirs 302 are arranged to capture liquid fuel 11B that is extant in inner chamber 202 and has backed up in fuel filler pipe 14 near the end of the tank-refueling activity after fuel tank 16 has been filled.

Each overflow reservoir 302 is bounded in part by a floor 302W that is located rear the distal end of nozzle-insertion housing 20 and is formed to include a reservoir drain hole 304 to meter discharge of overflow reservoir fuel 11O captured in the overflow reservoir 302 under gravity into fuel-conducting passageway 15 of fuel filler pipe 14. Each reservoir drain hole 304 has an inlet arranged to open upwardly into the companion overflow reservoir 302 and an outlet formed in an exterior surface of nozzle-insertion housing 20 to open downwardly into fuel-conducting passageway 15 of fuel filler pipe 14.

Figures 4, 5:
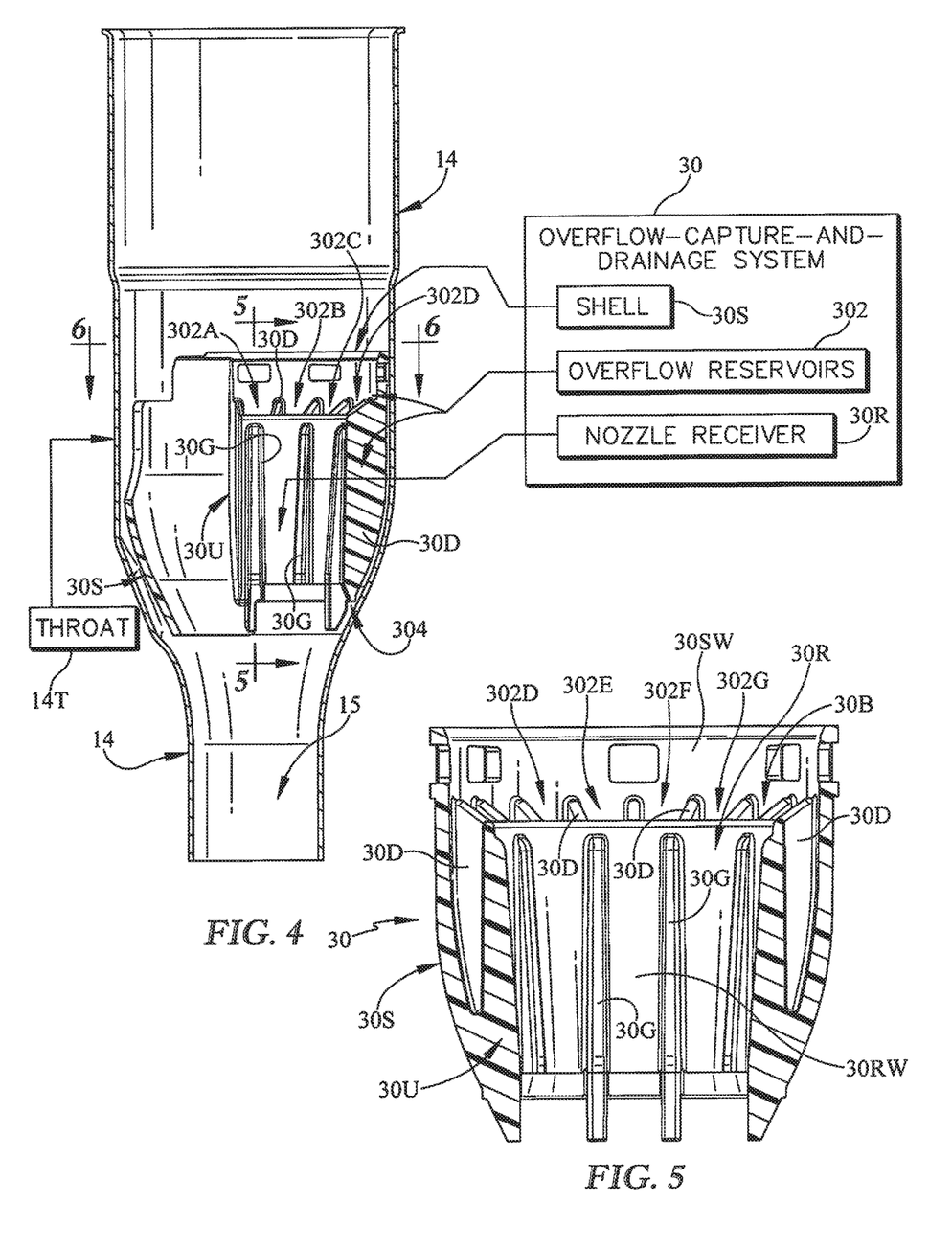
FIG. 4 is a sectional view of a portion of the fuel filler pipe shown in FIG. 3B after the overflow-capture-and-drainage system is mounted in a throat of the fuel filler pipe and showing that the system comprises a nozzle receiver, a shell surrounding the nozzle receiver, and a series of overflow reservoirs between the shell and the nozzle receiver.
FIG. 5 is an enlarged sectional view of the overflow-capture-and-drainage system of FIG. 4 by itself taken along line 5-5 of FIG. 4.

Overflow fuel management system 30 comprises a semi-circular fuel-collection unit 30U that is formed to define nozzle receiver 30R as suggested in FIGS. 3B and 4. Fuel-collection unit 30U is formed to include ten relatively deep overflow reservoirs 302A-302J that are arranged to lie in series in side-by-side relation to one another on a semi-circular arc around a central axis 20A of nozzle-insertion housing 20 and fuel filler pipe 14A as suggested in FIGS. 6 and 7. The semi-circular fuel-collection unit 30U is mounted in inner chamber 202 of nozzle-insertion housing 20 as shown in FIG. 4 and is oriented to cause a reservoir inlet opening into each overflow reservoir 302 to face outwardly toward outer chamber 201 of nozzle-insertion housing 20 as suggested in FIG. 3A. The reservoir drain hole 304 associated with each overflow reservoir 302 lies below its companion reservoir inlet near a lower edge of the semi-circular fuel-collection unit 30U as suggested in FIG. 3A.

Fuel-collection unit 30U is arranged to lie underneath inner flapper door 24 when inner flapper door 24 occupies the closed position as suggested in FIG. 3A. The fuel-collection unit 30U is also arranged to lie in laterally spaced-apart relation to inner flapper door 24 when inner flapper door 24 occupies the opened position. Nozzle tip 18T of fuel-dispensing pump nozzle 18 is arranged to lie between the opened inner flapper door 24 and the semi-circular fuel-collection unit 30U as suggested in FIG. 8 when pump nozzle 18 is inserted into outer and inner chambers 201, 202 during tank refueling so as to be surrounded in part by the semi-circular fuel-collection unit 30U and the ten relatively deep overflow reservoirs 302A-302J formed in fuel-collection unit 30U.

Figure 6:
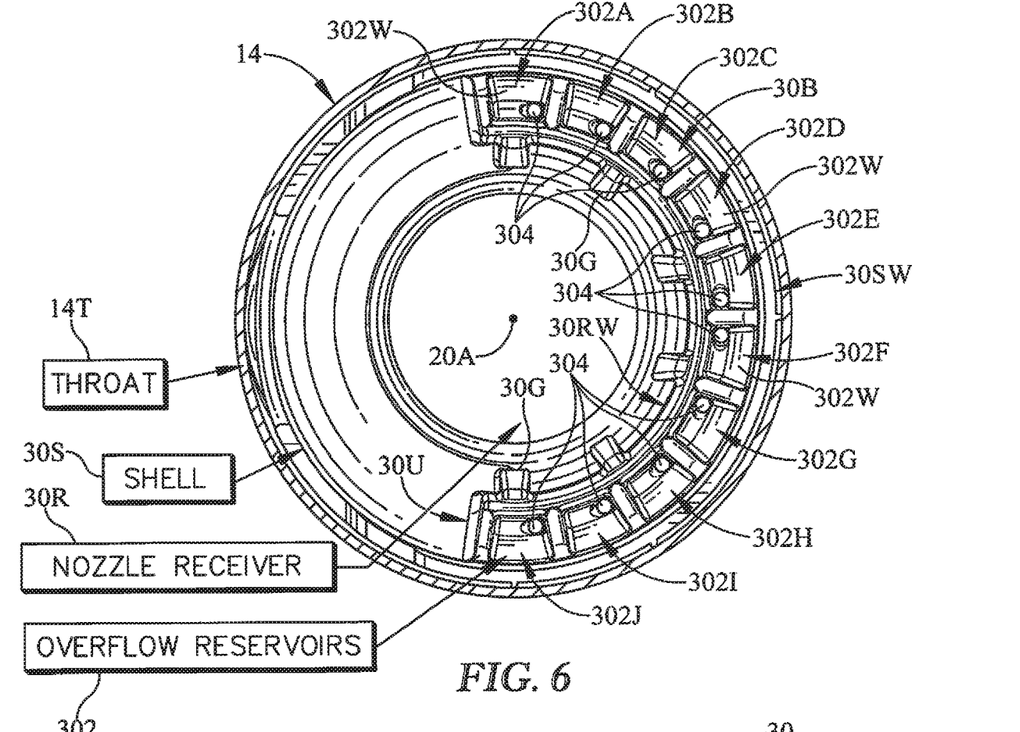
FIG. 6 an enlarged sectional view taken along line 6-6 of FIG. 5 showing the formation of ten top-opening overflow reservoirs in the overflow-capture-and-drainage system of the nozzle-insertion housing that has been mounted in the throat of the fuel filler pipe and showing that a pair of circumferentially spaced-apart divider walls cooperate with a curved inner wall included in the nozzle receiver and a curved outer wall included in the shell to form side walls for each overflow reservoir and a reservoir drain hole is formed in the floor associated with each overflow reservoir and also showing that six radially inwardly extending circumferentially nozzle-guide ribs are also included in the nozzle receiver and are coupled to the curved inner wall of the nozzle receiver.
Figure 7:
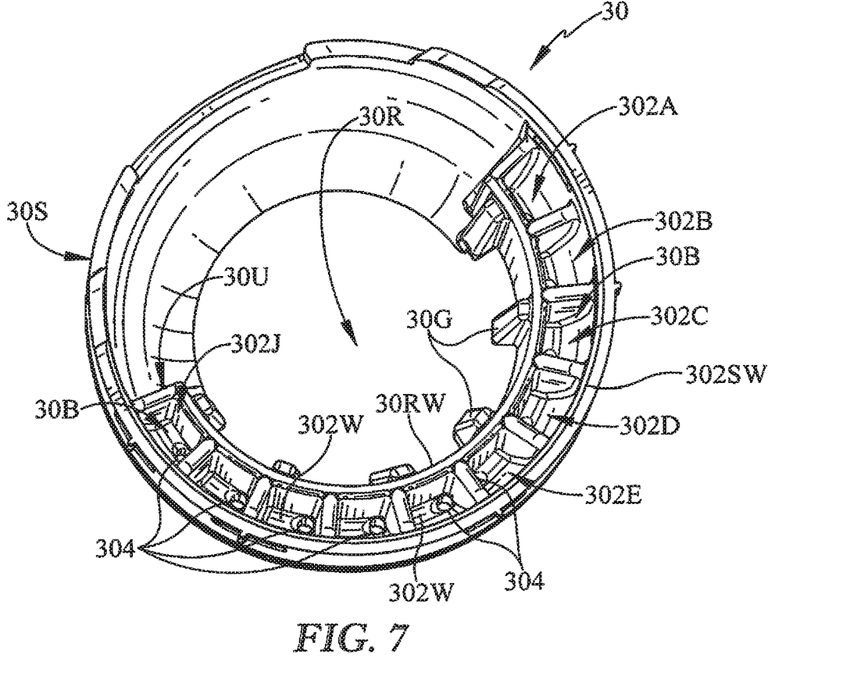
FIG. 7 is a top perspective view of the overflow-capture-and-drainage system shown in FIG. 6 showing top openings into each of the ten deep overflow reservoirs formed on an arc between the nozzle receiver and a surrounding portion of the shell and the companion six nozzle-guide ribs included in the nozzle receiver.

Fuel-collection unit 30U comprises a curved inner wall 30RW surrounded by a curved outer wall 30SW and a curved frusto-conical floor 302W arranged to interconnect the curved inner and outer walls 30RW, 30SW to form a semi-circular deep fuel-collection basin 30B between the curved inner and outer walls 30RW, 30SW as suggested in FIGS. 6 and 7. Several vertically oriented nozzle-receiver guides 30G are coupled to curved inner wall 30RW to form nozzle receiver 30R as suggested in FIG. 7. Each guide 30G is arranged to extend away from curved inner wall 30RW toward central axis 20A as suggested in FIG. 6.

Fuel-collection unit 30U further includes a series of tall divider walls 30D that lie in the fuel-collection basin 30B and are arranged to partition the deep basin 30B into a series of side-by-side top-opening deep overflow reservoirs 302A-302J. The curved frusto-conical floor 302W is formed to include a reservoir drain hole 304 for each overflow reservoir 302.

Capless filler pipe closure 10 of fill tube 13 is exposed to receive tip 18T of fuel-dispensing pump nozzle 18 during vehicle tank refueling as suggested in FIG. 1. An access door 26 is mounted for pivotable movement relative to a body panel 28 of vehicle 12 to an opened position as suggested in FIG. 1 to expose an outer flapper door 22 and provide access to capless filler pipe closure 10 during tank refueling activities.

Nozzle-insertion housing 20 also includes an outer door-support pin 22P that is configured to extend into a pin receiver 22R formed in middle section 20M of nozzle-insertion housing 20 as suggested in FIGS. 3A and 3B to support outer flapper door 22 for pivotable movement about an outer door-pivot axis 22A between opened and closed positions. In the closed position, outer flapper door 22 mates with an axially inwardly facing annular rim 200R to form a boundary of outer nozzle-receiving aperture 200A included in outer section 200 as suggested in FIGS. 3A and 3B.

Nozzle-insertion housing 20 also includes an inner door-support pin 24P that is configured to extend into a pin receiver 24R formed in inner section 20I of nozzle-insertion housing 20 as suggested in FIGS. 3A and 3B to support inner flapper door 24 for pivotable movement about an inner door-pivot axis 24A between opened and closed positions. In the position, inner flapper door 24 mates with an axially inwardly facing annular rim 20IR included in middle section 20M to form a boundary of inner nozzle-receiving aperture 20IA as suggested in FIGS. 3A and 3B.

Filler pipe closure 10 also includes an outer door-closing spring 23 for yieldably pivoting outer flapper door 22 about outer door-pivot axis 22A normally to assume the closed position and an inner door-closing spring 25 for yieldably pivoting inner flapper door 24 about inner door-pivot axis 24A normally to assume the closed position as shown, for example, in FIGS. 3B and 5. While outer door-closing spring 23 is mounted on outer door-support pin 22P and arranged to engage outer flapper door 22 as suggested in FIGS. 3A and 3B, inner door-closing spring 25 is not mounted on inner door-support pin 24P. Instead, in accordance with the present disclosure, inner door-closing spring 25 is mounted on a separate spring-support pin 25P that is located in spaced-apart relation to inner door-support pin 24P as suggested in FIGS. 3A and 3B. Spring-support pin 25P is configured to extend into a pin-receiver 25R formed in inner section 20I of nozzle-insertion housing 20 as suggested in FIGS. 3A and 3B. Inner door-closing spring 25 is arranged to engage a portion of inner flapper door 24A as suggested in FIG. 3A.

A capless filler pipe closure 10 is provided for a fuel filler pipe 14 that is associated with a vehicle fuel tank 16 as suggested in FIGS. 1 and 2. Capless filler pipe closure 10 includes a nozzle-insertion housing 20, an outer flapper door 22 having a rearwardly extending tail 22T, and an inner flapper door 24 having a rearwardly extending tail 24T as suggested in FIGS. 3 and 3A. Nozzle-insertion housing 20 is configured in accordance with the present disclosure to shield these rearwardly extension tails 22T, 24T from engagement with a tip 18T of a fuel-dispensing pump nozzle 18 as pump nozzle 18 is moved into and through nozzle-insertion housing 20 during tank refueling activities.

Nozzle-insertion housing 20 is sized to extend into fuel filler pipe 14 as shown in FIG. 3. Nozzle-insertion housing 20 is formed to include an outer nozzle-receiving aperture 20OA opening into an outer chamber 201 communicating with a fuel-conducting passageway 15 formed in fuel filler pipe 14 via an inner chamber 202 as suggested in FIG. 3A.

Nozzle-insertion housing 20 includes an outer section 20O including the radially inwardly extending outer ledge 20LO, a middle section 20M including outer door-support pin 22P, an inner section 20I, as suggested in FIG. 3A. Inner section 20I section is arranged to lie in axially spaced-apart relation to outer section 20O to locate middle section 20M between inner and outer sections 20I, 20O. An overflow-capture-and-drainage system 30 is coupled to inner section 20I and is configured in accordance with the present disclosure to conduct any conduct liquid fuel extant in inner chamber 202 formed in nozzle-insertion housing 20 after a tank-refueling activity has been completed into a fuel-conducting passageway 15 formed in fuel filler pipe 14 for delivery to fuel tank 16 as suggested in FIGS. 9 and 10.

The spring-loaded nozzle-actuated outer flapper door 22 is located in an outer end of nozzle-insertion housing 20 and yieldably biased to assume a closed position closing an outer nozzle-receiving aperture 20OA formed in nozzle-insertion housing 20 as shown in FIG. 3A. The spring-loaded inner flapper door 24 is yieldably biased to assume a closed position closing an inner nozzle-receiving aperture 20IA formed in a middle section 20M of nozzle-insertion housing 20 and arranged to lie in spaced-apart relation to outer flapper door 22 to define an outer chamber 201 of nozzle-insertion housing 20 as shown in FIG. 3A.

An outer section 200 of nozzle-insertion housing 20 is formed to include a center portion 203, a rim portion 204 arranged to surround center portion 203 to trap an outer end of fuel filler pipe 14 therebetween, and a series of frangible circumferentially spaced-apart break-away segments (F) coupled at one end to center portion 203 and at another end to rim portion 204 as suggested in FIGS. 2, 3A, 3B. A laser weld (W) is used to join center portion 203 of the outer section 20O of nozzle-insertion housing 20 to an upper cylindrical sleeve 20IS of an inner section 20I of the nozzle-insertion housing 20 that is used to support the pivotable inner flapper door 24.

An exploded assembly view of the component shown in FIG. 3A is provided in FIG. 3B to suggest that outer and middle sections 20O, 20M of the nozzle-insertion housing 20 cooperate with a spring-loaded outer flapper door 22 to form an outer module M1 of filler pipe closure 10. An inner section 20I of nozzle-insertion housing 20 cooperates with a spring-loaded inner flapper door 24 to form an inner module M2 of filler pipe closure 10 as suggested in FIG. 3B.

The invention claimed is:

1. A filler pipe closure for a fuel filler pipe associated with a vehicle fuel tank, the filler pipe closure comprising
a nozzle-insertion housing sized to extend into the fuel filler pipe and formed to include an outer nozzle-receiving aperture opening into an outer chamber communicating with a fuel-conducting passageway formed in the fuel filler pipe, and an inner nozzle-receiving aperture that is located to interconnect the outer chamber in fluid communication with the fuel-conducting passageway formed in the fuel filler pipe when the nozzle-insertion housing is mated with an outer end of the fuel filler pipe,
an outer flapper door mounted on the nozzle-insertion housing for pivotable movement about an outer door-pivot axis relative to the nozzle-insertion housing between a closed position closing the outer nozzle-receiving aperture and an opened position opening the outer nozzle-receiving aperture, an inner flapper door mounted on the nozzle-insertion housing for pivotable movement about an inner door-pivot axis relative to the nozzle-insertion housing between a closed position closing the inner nozzle-receiving aperture and an opened position opening the inner nozzle-receiving aperture, and
wherein the nozzle-insertion housing further includes overflow fuel management means located in spaced-apart relation to the outer flapper door to locate the inner flapper door therebetween when the inner flapper door occupies the closed positon for capturing liquid fuel that has backed up in the fuel-conducting passageway of the fuel filler pipe into an inner chamber formed in the nozzle-insertion housing below the outer chamber at the end of the a vehicle fuel tank refueling activity and draining captured fuel back into the fuel-conducting passageway of the fuel filler pipe before and after movement of the inner flapper door to the closed position.

2. A filler pipe closure for a fuel filler pipe associated with a vehicle fuel tank, the filler pipe closure comprising
a nozzle-insertion housing sized to extend into the fuel filler pipe and formed to include an outer nozzle-receiving aperture opening into an outer chamber communicating with a fuel-conducting passageway formed in the fuel filler pipe, and an inner nozzle-receiving aperture that is located to interconnect the outer chamber in fluid communication with the fuel-conducting passageway formed in the fuel filler pipe when the nozzle-insertion housing is mated with an outer end of the fuel filler pipe, an outer flapper door mounted on the nozzle-insertion housing for pivotable movement about an outer door-pivot axis relative to the nozzle-insertion housing between a closed position closing the outer nozzle-receiving aperture and an opened position opening the outer nozzle-receiving aperture, an inner flapper door mounted on the nozzle-insertion housing for pivotable movement about an inner door-pivot axis relative to the nozzle-insertion housing between a closed position closing the inner nozzle-receiving aperture and an opened position opening the inner nozzle-receiving aperture, and wherein the nozzle-insertion housing further includes overflow fuel management system located in spaced-apart relation to the outer flapper door to locate the inner flapper door therebetween when the inner flapper door occupies the closed positon and configured to capture liquid fuel that has backed up in the fuel-conducting passageway of the fuel filler pipe into an inner chamber formed in the nozzle-insertion housing below the outer chamber at the end of the a vehicle fuel tank refueling activity and drain captured fuel back into the fuel-conducting passageway of the fuel filler pipe before and after movement of the inner flapper door to the closed position, and wherein the overflow fuel management system comprises a shell that is formed to define at least a portion of the inner chamber of the nozzle-insertion housing, a nozzle receiver that is surrounded by the shell and aligned with and located below the inner nozzle-receiving aperture to receive a tip of a moving fuel-dispensing pump nozzle as the pump nozzle moves through the outer and inner nozzle-receiving aperture into the fuel-conducting passageway of the fuel filler pipe, and a barrier arranged to interconnect the nozzle receiver and a portion of the surrounding shell to form a fuel-collection basin having an inlet facing upwardly toward the outer chamber and opening into the inner chamber to capture liquid fuel extant in the inner chamber that has backed up past a top edge of the nozzle receiver and having an outlet draining into the fuel-conducting passageway of the fuel filler pipe.

3. The filler pipe closure of claim 2, wherein the barrier includes a floor arranged to interconnect an outwardly facing surface of the nozzle receiver and a companion inwardly facing surface of the portion of the surrounding shell and the floor is formed to include the outlet.

4. The filler pipe closure of claim 3, wherein the barrier further includes a first side wall coupled to the nozzle receiver, the portion of the surrounding shell, and a first end of the floor to define a first end of the fuel-collection basin and a second side wall arranged to lie in spaced-apart relation to the first side wall and coupled to the nozzle receiver, the portion of the surrounding shell, and an opposite second end of the floor to define a second end of the fuel-collection basin.

5. The filler pipe closure of claim 4, wherein the overflow management system further comprises a series of separated divider walls that lie in the fuel-collection basin in a space defined between the first and second side walls and are each coupled to the nozzle receiver, the portion of the surrounding shell, and the floor to define a series of side-by-side top-opening overflow reservoirs and the floor is formed to include a reservoir drain hole for each overflow reservoir to establish the outlet of the fuel-collection basin.

6. The filler pipe closure of claim 3, wherein the overflow management system further includes a series of divider walls that lie in the fuel-collection basin and are arranged to partition the fuel-collection basin into a series of side-by-side top-opening overflow reservoirs.

7. The filler pipe closure of claim 6, wherein the floor is formed to include a reservoir drain hole for each overflow reservoir to establish the outlet of the collection basin.

8. The filler pipe closure of claim 6, wherein the nozzle receiver includes a curved inner wall having a convex outer surface defining a boundary of the fuel-collection basin and mating with each of the divider walls located in the fuel-collection basin and a concave inner surface facing away from the fuel-collection basin toward a central axis of the nozzle-insertion housing and a plurality of vertically oriented nozzle-receiver guides coupled to the concave inner surface and arranged to extend radically inwardly toward the central axis of the nozzle-insertion house.

9. A filler pipe closure for a fuel filler pipe associated with a vehicle fuel tank, the filler pipe closure comprising a nozzle-insertion housing sized to extend into the fuel filler pipe and formed to include an outer nozzle-receiving aperture opening into an outer chamber communicating with a fuel-conducting passageway formed in the fuel filler pipe, and an inner nozzle-receiving aperture that is located to interconnect the outer chamber in fluid communication with the fuel-conducting passageway formed in the fuel filler pipe when the nozzle-insertion housing is mated with an outer end of the fuel filler pipe, an outer flapper door mounted on the nozzle-insertion housing for pivotable movement about an outer door-pivot axis relative to the nozzle-insertion housing between a closed position closing the outer nozzle-receiving aperture and an opened position opening the outer nozzle-receiving aperture, an inner flapper door mounted on the nozzle-insertion housing for pivotable movement about an inner door-pivot axis relative to the nozzle-insertion housing between a closed position closing the inner nozzle-receiving aperture and an opened position opening the inner nozzle-receiving aperture, and wherein the nozzle-insertion housing further includes overflow fuel management system located in spaced-apart relation to the outer flapper door to locate the inner flapper door therebetween when the inner flapper door occupies the closed positon and configured to capture liquid fuel that has backed up in the fuel-conducting passageway of the fuel filler pipe into an inner chamber formed in the nozzle-insertion housing below the outer chamber at the end of the a vehicle fuel tank refueling activity and drain captured fuel back into the fuel-conducting passageway of the fuel filler pipe before and after movement of the inner flapper door to the closed position, and wherein the overflow fuel management system comprises several overflow reservoirs that are located in the inner chamber of the nozzle-insertion housing to lie alongside a tip of a fuel-dispensing pump nozzle that is inserted into the outer and inner nozzle-receiving apertures of the nozzle-insertion housing during a tank-filling activity and each overflow reservoir is bounded in part by a floor that is located near a distal end of the nozzle-insertion housing and is formed to include a reservoir drain hole sized to meter discharge of overflow reservoir fuel captured in the overflow reservoir under gravity into the fuel-conducting passageway of the fuel filler pipe.

10. The filler pipe closure of claim 9, wherein each reservoir drain hole has an inlet arranged to open upwardly into the overflow reservoir and an outlet formed in an exterior surface of the nozzle-insertion housing to open downwardly into the fuel-conducting passageway of the fuel filler pipe when the nozzle-insertion housing is mated with the fuel filler pipe.

11. A filler pipe closure for a fuel filler pipe associated with a vehicle fuel tank, the filler pipe closure comprising a nozzle-insertion housing sized to extend into the fuel filler pipe and formed to include an outer nozzle-receiving aperture opening into an outer chamber communicating with a fuel-conducting passageway formed in the fuel filler pipe, and an inner nozzle-receiving aperture that is located to interconnect the outer chamber in fluid communication with the fuel-conducting passageway formed in the fuel filler pipe when the nozzle-insertion housing is mated with an outer end of the fuel filler pipe, an outer flapper door mounted on the nozzle-insertion housing for pivotable movement about an outer door-pivot axis relative to the nozzle-insertion housing between a closed position closing the outer nozzle-receiving aperture and an opened position opening the outer nozzle-receiving aperture, an inner flapper door mounted on the nozzle-insertion housing for pivotable movement about an inner door-pivot axis relative to the nozzle-insertion housing between a closed position closing the inner nozzle-receiving aperture and an opened position opening the inner nozzle-receiving aperture, and wherein the nozzle-insertion housing further includes overflow fuel management system located in spaced-apart relation to the outer flapper door to locate the inner flapper door therebetween when the inner flapper door occupies the closed positon and configured to capture liquid fuel that has backed up in the fuel-conducting passageway of the fuel filler pipe into an inner chamber formed in the nozzle-insertion housing below the outer chamber at the end of the a vehicle fuel tank refueling activity and drain captured fuel back into the fuel-conducting passageway of the fuel filler pipe before and after movement of the inner flapper door to the closed position, and wherein the overflow fuel management system comprises a semi-circular fuel-collection unit that is formed to define a nozzle receiver that is located in the inner chambers of the nozzle-insertion housing and is aligned with and located below the inner nozzle-receiving aperture and the semi-circular fuel-collection unit is formed to include several overflow reservoirs that are arranged to lie in side-by-side relation to one another on a semi-circular arc around the nozzle receiver and a central axis of the nozzle-insertion housing.

12. The filler pipe closure of claim 11, wherein the semi-circular fuel-collection unit is oriented along the central axis of the nozzle-insertion housing to cause a reservoir inlet opening into each overflow reservoir to face outwardly toward the outer chamber of the nozzle-insertion housing and to cause a reservoir drain hole associated with each overflow reservoir to lie below a companion reservoir inlet near a lower edge of the semi-circular fuel-collection unit.

13. The filler pipe closure of claim 12, wherein the semi-circular fuel-collection unit is arranged to lie underneath the inner flapper door when the inner flapper door occupies the closed position.

14. The filler pipe closure of claim 12, wherein the semi-circular fuel-collection unit is arranged to lie in laterally spaced-apart relation to the inner flapper door when the inner flapper door occupies the opened position to cause a tip of a fuel-dispensing pump nozzle to be arranged to lie between the opened flapper door and the semi-circular fuel-collection unit when the pump nozzle is inserted into the outer and inner chambers during a tank refueling activity so as to be surrounded in part by the semi-circular fuel-collection unit and the overflow reservoirs formed in the semi-circular fuel-collection unit.

15. The filler pipe closure of claim 11, wherein the semi-circular fuel-collection unit comprise a curved inner wall, a curved outer wall arranged to extend around the curved inner wall, a curved floor arranged to interconnect the curved inner and outer walls to form a semi-circular fuel-collection basin between the curved inner and outer walls, and a series of divider walls that lie in the semi-circular fuel-collection basin and are arrange to partition the basin into a series of side-by-side top-opening overflow reservoirs.

16. The filler pipe closure of claim 15, wherein the curved floor is formed to include a reservoir drain hole for at least some of the overflow reservoirs.

17. The filler pipe closure of claim 15, wherein the curved floor has a frusto-conical shape.

18. The filler pipe closure of claim 1, wherein the overflow fuel management means comprises a shell that is formed to define at least a portion of the inner chamber of the nozzle-insertion housing, a nozzle receiver that is surrounded by the shell and aligned with and located below the inner nozzle-receiving aperture to receive a tip of a moving fuel-dispensing pump nozzle as the pump nozzle moves through the outer and inner nozzle-receiving aperture into the fuel-conducting passageway of the fuel filler pipe, and a barrier arranged to interconnect the nozzle receiver and a portion of the surrounding shell to form a fuel-collection basin having an inlet facing upwardly toward the outer chamber and opening into the inner chamber to capture liquid fuel extant in the inner chamber that has backed up past a top edge of the nozzle receiver and having an outlet draining into the fuel-conducting passageway of the fuel filler pipe.

19. The filler pipe closure of claim 1, wherein the overflow fuel management means comprises a semi-circular fuel-collection unit that is formed to define a nozzle receiver that is located in the inner chambers of the nozzle-insertion housing and is aligned with and located below the inner nozzle-receiving aperture and the semi-circular fuel-collection unit is formed to include several overflow reservoirs that are arranged to lie in side-by-side relation to one another on a semi-circular arc around the nozzle receiver and a central axis of the nozzle-insertion housing.

20. The filler pipe closure of claim 1, wherein the overflow fuel management means comprises several overflow reservoirs that are located in the inner chamber of the nozzle-insertion housing to lie alongside a tip of a fuel-dispensing pump nozzle that is inserted into the outer and inner nozzle-receiving apertures of the nozzle-insertion housing during a tank-filling activity and each overflow reservoir is bounded in part by a floor that is located near a distal end of the nozzle-insertion housing and is formed to include a reservoir drain hole sized to meter discharge of overflow reservoir fuel captured in the overflow reservoir under gravity into the fuel-conducting passageway of the fuel filler pipe.

* * * * *